United States Patent Office 3,704,275
Patented Nov. 28, 1972

3,704,275
THERMOPLASTIC MOLDING COMPOSITIONS ON THE BASIS OF POLYOXYMETHYLENES
Karlheinz Burg, Lagenhain, Ernst Wolters, Frankfurt am Main, Harald Cherdron, Wiesbaden, and Hans-Joachim Leugering, Frankfurt am Main, Germany, assignors to Farbwerke Hoechst Aktiengesellschaft vormals Meister Lucius & Bruning, Frankfurt am Main, Germany
No Drawing. Filed Aug. 3, 1970, Ser. No. 60,722
Claims priority, application Germany, Aug. 7, 1969,
P 19 40 132.2
Int. Cl. C08g 51/04
U.S. Cl. 260—37 AL
11 Claims

ABSTRACT OF THE DISCLOSURE

Thermoplastic molding compositions on the basis of polyoxymethylenes are provided which, besides the polyoxymethylenes, may contain polymers of varying composition with a definite size of the particles as dispersed phase and which are nucleated with such an amount of inorganic nucleating agent that the size of the polyoxymethylene spherulites formed under definite conditions is within a limited range. The moulding compositions are suitable for the manufacture of shaped articles of any kind and have improved mechanical properties.

The present invention relates to thermoplastic molding compositions on the basis of polyoxymethylenes (POM).

It is known that polyoxymethylenes have a strong tendency to crystallize. Even if the melt is undercooled to a small extent only, a rapid growth of spherulites is observed which, in most cases, are much larger than the length of light waves and confer upon the material a considerable opacity. Moreover, owing to the crystallization process a great number of microscopically small fissures and internal tensions are formed in the interior and on the surface of the material. These fissures and internal tensions detrimentally affect the mechanical properties of shaped articles, for example injection molded articles, made from polyoxymethylenes. The aforesaid flaws are the more pronounced the larger the individual spherulites.

It is also known that by adding 0.0001 to 0.5% by weight of talc to polyoxymethylenes of high molecular weight and uniformly distributing the said inorganic nucleating agent in the organic polymer, the crystal structure of injection molded articles can be rendered more uniform and hence a structure of coarse spherulites having an average diameter of 100 microns can be transformed into a homogeneous structure in which the spherulites have a diameter of 4 to 8 microns (cf. German Auslegeschrift No. 1,247,645). The aforesaid data relate to injection molded articles which have been crystallized under pressure at a temperature in the range of from 150 to 240° C.

The present invention provides a thermoplastic molding composition on the basis of polyoxymethylenes essentially consisting of a polyoxymethylene having a reduced specific viscosity of from 0.07 to 2.5 dl.g.$^{-1}$ and a crystallite melting point of from 150 to 180° C. and an inorganic nucleating agent in an amount of from 0.0005 to 1.0% by weight, calculated on the total mixture, which molding composition is characterized in that the polyoxymethylene spherulites formed in the isothermal crystallization of the molding composition under a pressure of 1 atmosphere at 150° C. have a diameter on the range of from 30 to 250 microns, preferably 50 to 150 microns.

The present invention also provides a thermoplastic molding composition on the basis of polyoxymethylenes essentially consisting of a polyoxymethylene as specified above, 0.0005 to 1.0% by weight of an inorganic nucleating agent and 0.1 to 10% by weight, the percentages being calculated on the total mixtue, of a polymer having an average molecular weight of from 1,000 to 1,000,-000, a softening temperature below the crystallite melting point of the said polyoxymethylene, a second order transition temperature of from —120 to +30° C., which polymer is dispersed in the molding composition in the form of particles having a diameter in the range of from 0.1 to 5 microns.

The molding composition of the invention is suitably produced by mixing the polymeric components in a high speed mixer (about 1,000 to 2,000 revolutions per minute) with the commonly used stabilizers against oxidation, heat and the action of light, and the inorganic nucleating agent and transforming the mixture into granules o an extruder at a temperature in the range of from 150 to 240° C., preferably 170 to 220° C.

To determine the size of the spherulites of the polyoxymethylene in the granules thus obtained a film is made under definite conditions (cf. Example 1). The average size of the spherulites of the polyoxymethylene is determined by examining the film under the polarizing microscope. If the size of the spherulites is not within the range of the invention, it is adjusted within the indicated range by variation of the amount and/or the particle size of the nucleating agent and/or by using another mixing device. In order to enlarge the spherulites the concentration of the inorganic nucleating agent may be reduced or its particle size increased, whereas for diminishing the size of the spherulites the concentration of the agent forming nuclei can be increased or its size reduced.

The aforesaid film is also used to determine the particle size of the polymer dispersed in the polyoxymethylene by means of phase-contrast microscopy. The particle size of the dispersed phase likewise depends on a great number of parameters, for example the type and concentration of the polymer to be added, the mixing temperature, the melt viscosity of the polymer and the type of the mixing device used. It, herefore, proved to be advantageous to optimize and control the mixing conditions with regard to the particle size by the aforesaid microscopy.

The following Table 1 shows that the size of the spherulites of a given polyoxymethylene largely depends on the pressure and temperautre conditions during crystallization.

TABLE 1

[Size of spherulites of a copolymer consisting of 98% by weight of trioxane and 2% by weight of ethylene oxide (RSV 0.73 dl.g.⁻¹)]

| Nucleating agent | | Size of spherulites (microns) after crystallization at— | |
|---|---|---|---|
| Type | Amount (wt. percent) | 150° C., 1 atm. | 80° C., 50 atm. |
| | | 419 | 124 |
| Talc | 0.005 | 125 | 39 |
| Do | 0.01 | 88 | 27 |

Polyoxymethylenes in the sense of the present invention are homo- and copolymers of formaldehyde or a cyclic oligomer of formaldehyde, preferably trioxane. By homopolymers there are to be understood those polymers of formaldehyde or a cyclic oligomer of formaldehyde the terminal hydroxyl groups of which have been stabilized against degradation by chemical reaction, for example esterification or etherification.

As polyoxymethylenes there are suitably used copolymers of trioxan and cyclic ethers having 3 to 5 ring members, preferably epoxides, and/or cyclic acetals having 5 to 11 ring members, preferably 5 to 8 ring members, and/or linear polyformals, for example polydioxolane.

Suitable comonomers for trioxane are, above all, compounds of the following formula

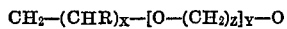

$$CH_2\text{—}(CHR)_x\text{—}[O\text{—}(CH_2)_z]_y\text{—}O$$

in which R represents a hydrogen atom, an aliphatic alkyl radical having 1 to 6, preferably 1 to 3, carbon atoms, or a phenyl radical, $x$ is an integer of from 1 to 3 when $y$ is zero, $y$ is an integer of from 1 to 3 when $x$ is zero and $z$ is 2, and $z$ is an integer in the range of from 3 to 6, preferably 3 or 4, when $x$ is zero and $y$ is 1.

As cyclic ether ethylene oxide is especially suitable; styrene oxide, propylene oxide and epichlorohydrin also being well suitable.

Especially suitable cyclic acetals are glycol formal (1,3-dioxane), butanediol-formal (1,3-dioxepane), and diglycol formal (1,3,6-trioxocane). 4-chloromethyl-1,3-dioxolane and hexanediol formal (1,3-dioxonane) are also well suitable.

The trioxane copolymers are stabilized against thermal decomposition by hydrolytic degradation to terminal primary alcohol groups.

The reduced specific viscosity (RSV) of the polyoxymethylenes used according to the invention is in the range of from 0.07 to 2.50 dl.g.⁻¹, preferably 0.14 to 1.20 dl.g.⁻¹, measured at 140° C. in a solution of 0.5 g. of the polyoxymethylene in 100 milliliters of butyrolactone with the addition of 2% by weight of diphenyl amine, their crystallite melting points are in the range of from 150 to 180° C., preferably 150 to 170° C. The density of the polyoxymethylenes used is in the range of 1.40 to 1.45 g.ml.⁻¹, measured according to DIN specification 53,479.

As modifying components (dispersed phase) of the molding compositions according to the invention polymers are added the softening temperature of which is below the crystallite melting point of the respective polyoxymethylene, preferably in the range of from +50 to +160° C. and the second order transition temperature of which is in the range of from —120 and +30° C., advantageously —80 to 0° C.

Suitable modifying components are, in the first place, homo- and copolymers of olefinically unsaturated compounds of the formula

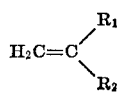

$$H_2C=C\begin{matrix}R_1\\R_2\end{matrix}$$

in which $R_1$ represents a hydrogen atom or a methyl group and $R_2$ represents a hydrogen atom, a carboxyl group, an alkylcarboxyl group having 2 to 10 and preferably 2 to 5 carbon atoms, an acyloxy group having 2 to 5 and preferably 2 or 3 carbon atoms, or a vinyl group, for example:

(1) Homo- and copolymers of α-olefins such as polyethylene, ethylene/propylene copolymers, ethylene/acrylic acid ester copolymers, ethylene/methacrylic acid ester copolymers, ethylene/acrylic acid copolymers; polyethylene as well as copolymers of ethylene with vinyl acetate and copolymers of ethylene with acrylic acid esters having 4 to 12 and preferably 4 to 7 carbon atoms and in which the proportion by weight of ethylene is in the range of from 40 to 90%, advantageously 50 to 80%, being especially suitable, (2) Homo- and copolymers of 1,3-dienes having 4 or 5 carbon atoms, for example polybutadiene, polyisoprene, butadiene/styrene copolymers, butadiene/acrylonitrile copolymers;

(3) Homo- and copolymers of vinyl esters, such as poly(vinyl acetate), poly(vinyl propionate), and poly (vinyl butyrate);

(4) Homo- and copolymers of acrylic and methacrylic acid esters, such as poly(ethyl acrylate), poly(butyl acrylate), poly(butyl methacrylate), poly(hexyl methacrylate), poly(2-ethylhexyl methacrylate), poly(octyl methacrylate).

As modifying component there may also be used polyethers and polyesters. By polyethers there are to be understood homo- and copolymers of cyclic ethers, for example poly(ethylene oxide), poly(propylene oxide), poly(3,3-dimethyloxetane). Especially suitable are ethylene oxide/propylene oxide copolymers as well as poly(tetrahydrofuran).

Suitable polyesters are compounds of dibasic carboxylic acids and diols, especially polyesters of linear, aliphatic dicarboxylic acids having 4 to 12 carbon atoms, with α,ω-diols having 2 to 8 and preferably 2 to 4 carbon atoms, for example polyesters of sebacic acid and ethylene glycol or of sebacic acid and butanediol.

The molecular weight of the modifying polymeric component may vary within wide limits. There may be used products having a molecular weight of 1,000 to 1,000,000, preferably 1,000 to 300,000. Especially good results are obtained with mixing components having a molecular weight in the range of from 5,000 to 150,000.

The concentration of the polymers blended into the composition is in the range of from 0.1 to 10% by weight, advantageously 0.1 to 5% by weight. Especially good results are obtained with compositions containing 0.3 to 3% by weight of the polymer.

The particles of the dispersed phase have a diameter in the range of from 0.1 to 5 mircrons, preferably 0.1 to 3 microns and more preferably 0.2 to 2 microns.

Suitable inorganic nucleating agents are substances that do not melt at the working temperature of the polyoxymethylene compositions, are insoluble therein and form nuclei of crystallization when the melt is cooled. The nucleating agents should have neither a strongly acid nor a strongly alkaline reaction since otherwise they would bring about degradation of the polyoxymethylene and/or strong discolorations.

As nucleating agents there are used, in the first place, silicates of magnesium and aluminum, for example talc, enstatite, antigorite, montmorillonite, and kaolinite, as well as the double carbonate of magnesium and calcium (dolomite), boron nitride, magnesium oxide and sulfide, zinc oxide and sulfide, and titanium dioxide. Especially good nucleating agents are boron nitride and talc as well as a mixture of talc and calcium/magnesium carbonate, preferably in a proportion by weight of 1:1.

For adjustment of an optimum size of the spherulites of the polyoxymethylenes not only the type of the nucleating agent but also the amount and the particle size thereof as well as the mixing device used are of decisive importance. The nucleating agents are blended into the polyoxymethylene in an amount of from 0.0005 to 1.0% by weight, calculated on the total mixture, an amount in the range of from 0.005 to 0.5% by weight being preferred.

With an increasing concentration of the nucleating agent the spherulites of the polyoxymethylene become smaller and smaller (cf. Table 4). To obtain spherulites of equal size a nucleating agent with a smaller particle size need to be used in a lower concentration than a nucleating agent with larger particles (cf. Table 5).

The distribution of the nucleating agent in the molten polyoxymethylene molding composition and hence its effectiveness substantially depends on the type of mixer used. When a single screw extruder having a little kneading effect is used larger spherulites are obtained than using a double screw extruder with a thorough mixing effect, the other working conditions, the amount and particle size of the nucleating agent being the same (cf. Table 3).

When mixing the components of the molding composition of the invention, stabilizers against the action of heat, oxygen and light may be added. Suitable heat stabilizers are, for example, polyamides, amides of polybasic carboxylic acids, amidines, hydrazines, ureas and poly(N-vinyl-lactams). As oxydation stabilizers phenols, especially bisphenols, and aromatic amines are used and suitable stabilizers against the action of light are derivatives of α-hydroxy-benzophenone and of benzotriazole, the stabilizers being used in an amount of from 0.1 to 10% by weight, preferably 0.5 to 5% by weight, calculated on the total mixture.

Shaped articles made from the polyoxymethylene compositions of the invention have a better ball indentation hardness and stiffness in torsion than shaped articles made from a polyoxymethylene which does not contain a nucleating agent. Moreover, they have a much higher impact strength, determined by a drop test (cf. Table 2). Shaped articles made from a polyoxymethylene composition in which the size of the spherulites is below 30 microns or above 250 microns have only a little improved impact strength, as compared with articles made from polyoxymethylene which has not been nucleated according to the invention, while articles made from a composition in which the polyoxymethylene spherulites have a size of from 30 to 250 microns have a substantially improved impact strength (cf. Table 4).

In the case of polyoxymethylenes nucleated according to the invention and modified by adding further polymers having definite particle size in dispersed form, the nucleation improves not so much the relatively good impact strength but rather distinctly the ball indentation hardness and stiffness in torsion as compared with molding compositions that have not been nucleated (cf. Tables 6 and 7).

The molding composition of the invention can be comminuted mechanically, for example by chopping or grinding, into granules, chips, flakes or powders, and processed in the thermoplastic state, for example by injection molding or extrusion, into shaped articles, for example bars, rods, sheets, films, ribbons and tubes.

The following examples illustrate the invention, the percentages being by weight unless otherwise stated.

EXAMPLE 1

(a) A copolymer of 98% of trioxane and 2% of ethylene oxide, having a density of 1.41 g.ml.$^{-1}$ a reduced specific viscosity of 0.73 dl.g.$^{-1}$, a melt index of 9.0 g./10 min. and a crystallite melting point of 166° C. was mixed with 0.5% of bis(2-hydroxy-3-tert-butyl-5-methylphenyl)-methane and 0.1% of dicyanodiamide and varying amounts of a mixture of talc and dolomite (proportion by weight 1:1), the mixture was homogenized at 200° C. on a single screw extruder. The residence time in the cylinder was about 4 minutes. The nucleating agent had the following particle size distribution:

| | Percent |
|---|---|
| At most 1 micron | 43 |
| 2 microns | 38 |
| 3 microns | 10 |
| 4 microns | 2 |
| At least 5 microns | 7 |

(b) To determine the size of the spherulites in the products obtained films having a thickness of about 10 microns were prepared from the respective polyoxymethylene granules by melting them at 180° C. between two glass plates under a pressure of 200 kp.cm.$^{-2}$ with subsequent crystallization at 150° C. at atmospheric pressure, which films were examined under the microscope.

Furthermore, sheets of dimensions 60 x 60 x 2 millimeters were made from the granules by injection molding at a temperature of the composition of 200° C. and a temperature of the mold of 80° C., which sheets were subjected to a drop test to determine the impact strength. For this purpose a sheet clamped in a frame was subjected to impact by allowing a hammer having a definite weight to fall onto the sheet from different heights. As a measurement for the impact strength there is given the height which is sufficient for the hammer to break 50% of the sheets (average value from 40 drop tests).

The melt index was determined according to DIN (German Industrial Standards) 53,735 at 190° C. under a load of 2.16 kilograms.

The ball indentation hardness was determined according to VDE (Verband Deutscher Elektrotechniker) 0302 on injection molded specimens with a time of load of 10 seconds.

The stiffness in torsion was measured according to DIN 53,447 with molded plates having a thickness of 2 millimeters at a temperature of 120° C. with a time of load of 60 seconds.

The mechanical properties of polyoxymethylene which had not been nucleated and polyoxymethylene nucleated according to the invention are indicated in the following Table 2.

TABLE 2

| Nucleating agent | | Size of spherulites (microns) | Ball indentation hardness (kp. cm.$^{-2}$) | Stiffness in torsion (kp. cm.$^{-2}$) | Dropping height (cm.) hammer 100 g. |
|---|---|---|---|---|---|
| Type | Amount (percent) | | | | |
| | | 493 | 1,400 | 1,290 | 23 |
| Dolomite + talc (1:1). | 0.2 | 69 | 1,470 | 1,670 | 130 |
| | 0.3 | 49 | 1,490 | 1,650 | 115 |

The dependence of the size of the spherulites of the polyoxymethylene on the type of the mixer is shown in the following Table 3.

TABLE 3

| Nucleating agent | | Size of spherulites when using— | |
|---|---|---|---|
| Type | Amount (percent) | Single screw extruder, microns | Double screw extruder, microns |
| | | 500 | 500 |
| Dolomite plus talc (1:1) | 0.1 | 90 | 30 |
| | 0.2 | 69 | 25 |

EXAMPLE 2

(a) In the manner described in Example 1, a copolymer of 98% of trioxane and 2% of ethylene oxide, having a density of 1.41 g.ml.$^{-1}$, a reduced specific viscosity of 0.68 dl.g.$^{-1}$ and a crystallite melting point of 164° C., was mixed with stabilizers and nucleating agent, with the exception that talc alone was used instead of the mixture of the talc and dolomite.

The talc had the following particle size distribution:

|  | Percent |
|---|---|
| At most 10 microns | 53 |
| 20 microns | 14 |
| 30 microns | 10 |
| 40 microns | 7 |
| At least 50 microns | 16 |

(b) The following Table 4 illustrates the dependence of the spherulite size, determined according to Example 1b, and of the impact strength of the polyoxymethylene composition on the amount of nucleating agent.

TABLE 4

| Nucleating agent | | Size of spherulites (microns) | Dropping height (cm.) hammer weight 100 g. |
|---|---|---|---|
| Type | Amount (percent) | | |
|  |  | 490 | 14 |
| Talc | 0.005 | 171 | 198 |
| Do | 0.01 | 129 | 235 |
| Do | 0.05 | 137 | 232 |
| Do | 0.1 | 61 | 177 |
| Do | 0.3 | 22 | 92 |
| Do | 0.5 | 19 | 84 |
| Do | 1.0 | 20 | 35 |

EXAMPLE 3

(a) In the manner described in Example 1, a copolymer of 98% of trioxane and 2% of ethylene oxide, having a density of 1.41 g.ml.$^{-1}$, a reduced specific viscosity of 0.75 dl.g.$^{-1}$ and a crystallite melting point of 164° C., was mixed with stabilizers and nucleating agent, the nucleating agent being talc of different particle size.

(b) The following Table 5 illustrates the influence of the amount and the particle size of the nucleating agent on the size of the spherulites of the polyoxymethylene measured after crystallization at 150° C. under 1 atmosphere.

TABLE 5

| Nucleating agent | | | Size of spherulites (microns) |
|---|---|---|---|
| Type | Amount (percent) | Particle size | |
| Talc | 0.05 | As defined in Ex. 2a | 142 |
| Do | 0.05 | Below 1 micron | 89 |
| Do | 0.1 | As defined in Ex. 2a | 50 |
| Do | 0.1 | Below 1 micron | 30 |

EXAMPLES 4–13

In the manner described in Example 1, different polyoxymethylenes were mixed with different modifying components as well as with stabilizers and different nucleating agents.

The nucleating agents used had the following particle size distribution:

|  | Talc, percent | Mixture of talc and dolomite (1:1), percent |
|---|---|---|
| At most 1 micron | 25 | 35 |
| 2 microns | 15 | 18 |
| 3 microns | 13 | 14 |
| 4 microns | 12 | 15 |
| At least 5 microns | 35 | 18 |

The properties of the polymer components and of the respective composition obtained were determined as specified in Example 1 and are indicated in Table 7.

EXAMPLE 14

In the manner described in Example 1, a mixture consisting of 98.5% of a copolymer of 98% of trioxane and 2% of ethylene oxide having a density of 1.41 g.ml.$^{-1}$, a reduced specific viscosity of 0.73 dl.g.$^{-1}$, a crystallite melting point of 166° C. and a melt index $i_2$ of 9.0 g./10 min., and 1.5% of a copolymer of 68% of ethylene and 32% of vinyl acetate having a melt index $i_2$ of 24 g./10 min., measured according to DIN 53,735 at 190° C., was mixed with stabilizers and varying amounts of a mixture of talc and calcium-magnesium carbonate (porportion by weight 1:1).

The distribution of the particle sizes of the nucleating agent was the same as that specified in Examples 4 to 13. The dispersed phase had a particle diameter of from 0.2 to 2.0 microns.

The following Table 6 illustrates that the ball indentation hardness and the impact strength of the molding composition, as well as the size of the spherulites of the polyoxymethylene, determined according to Example 1, depend on the amount of nucleating agent used.

TABLE 6

| Nucleating agent, percent | Ball indentation hardness (kp./cm.$^{-2}$) | Dropping height (cm.), weight of hammer, 500 g. | Size of spherulites (microns) |
|---|---|---|---|
|  | 1,505 | 120 | 438 |
| 0.05 | 1,510 | 123 | 270 |
| 0.1 | 1,525 | 135 | 143 |
| 0.2 | 1,535 | 127 | 101 |
| 0.3 | 1,545 | 130 | 53 |
| 0.4 | 1,545 | 102 | 32 |
| 0.5 | 1,550 | 71 | 17 |
| 1.0 | 1,545 | 39 | 9 |

Comparative Examples A to C

Molding compositions were produced from (A) the formaldehyde homopolymer specified in Example 4,
(B) the trioxane copolymer specified in Example 6 and
(C) the trioxane copolymer specified in Example 12 and the mechanical properties of the compositions without modifying polymer and without nucleating agent were determined as described in Example 1. The results are listed in Table 7.

Comparative Examples D and E

Molding compositions were produced from (D) the trioxane copolymer and the modifying component specified in Example 6 and
(E) the trioxane copolymer and the modifying component specified in Example 11 and the mechanical properties of the compositions without nucleating agent were determined as described in Example 1. The results are likewise indicated in Table 7.

The abbreviations used in Table 7 have the following meaning:

TO—trioxane
EO—ethylene oxide
DO—1,3-dioxolane
Vina—vinyl acetate
EA—ethyl acrylate
PO—propylene oxide
AN—acrylonitrile

TABLE 7

| Example | Polyoxymethylene Composition, weight percent | RSV (dl g⁻¹) | Melt index (g/10 min.) | Modifying component Composition, weight percent | Melt index (g/10 min.) | Molecular weight | Sec. trans. order temp. (°C) | Amount weight percent | Nucleating agent Particle size (micron) | Composition | Amount, weight percent | Ball indentation hardness (kp. cm⁻²) | Stiffness in torsion (kp. cm⁻²) | Impact strength Hammer weight, g. | Dropping height (cm.) | Size of spherulites (micron) |
|---|---|---|---|---|---|---|---|---|---|---|---|---|---|---|---|---|
| A | Formaldehyde homopolymer, acetylized | 0.69 | 8.9 | | | | | | | | | 1,640 | 2,000 | 500 | 10 | 482 |
| B | Copolymer TO/EO (98/2) | 0.73 | 9.0 | | | | | | | | | 1,430 | 1,360 | 500 | 13 | 470 |
| C | Copolymer TO/DO (97/3) | 0.70 | 9.1 | | | | | | | | | 1,460 | 1,390 | 500 | 11 | 502 |
| D | Copolymer TO/EO (98/2) | 0.73 | 9.0 | | | | | | | | | 1,350 | 1,300 | 500 | 13 | 419 |
|   |   |   |   |   |   |   |   |   |   |   |   |   |   | 500 | 11 |   |
|   |   |   |   |   |   |   |   |   |   |   |   |   |   | 500 | 14 |   |
|   |   |   |   |   |   |   |   |   |   |   |   |   |   | 500 | 270 |   |
| E | Copolymer TO/DO (97/3) | 0.70 | 9.1 | Polyethylene | 8.6 | | −80 | 3 | | | | 1,340 | 1,290 | 200 | 150 | 434 |
| 4 | Formaldehyde homopolymer, acetylized | 0.69 | 8.9 | Copolymer ethylene/EA (65/35) | 15 | | −10 | 3 5 | 0.5–5.0 0.5–5.0 | Talcum | 0.05 | 1,600 | 2,100 | 500 | 200 | 123 |
| 5 | ...do | 0.69 | 8.9 | Poly(tetrahydrofuran) | | 40,000 | −79 | 2 | 0.1–2.0 | ...do | 0.2 | 1,610 | 2,150 | 200 | 175 | 45 |
| 6 | Copolymer TO/EO (98/2) | 0.73 | 9.0 | Copolymer ethylene/vinyl- acetate (68/32) | 24 | | −15 | 3 | 0.2–2.0 | Talcum dolomite (1:1) | 0.2 | 1,400 | 1,490 | 500 | 260 | 58 |
| 7 | ...do | 0.73 | 9.0 | Copolymer EO/PO (80/20) | | 50,000 | −70 | 5 | 0.5–5.0 | Talcum dolomite (1:1) | 0.2 | 1,380 | 1,390 | 500 | 195 | 35 |
| 8 | ...do | 0.73 | 9.0 | Copolymer ethylene/vinyl- acetate (72/28) | 15 | | −15 | 2 | 0.1–1.5 | Talcum dolomite (1:1) | 0.4 | 1,390 | 1,470 | 500 | 240 | 63 |
| 9 | ...do | 0.73 | 9.0 | Copolymer butadiene/AN (80/20) | | 30,000 | −45 | 3 | 0.5–5.0 | Talcum | 0.2 | 1,410 | 1,450 | 200 | 145 | 41 |
| 10 | ...do | 0.83 | 6.0 | Poly(2-ethylhexylmethac- rylate) | | 110,000 | −50 | 3 | 0.5–5.0 | ...do | 0.1 | 1,400 | 1,470 | 200 | 180 | 69 |
| 11 | Copolymer TO/DO (97/3) | 0.70 | 9.0 | Polyethylene | 8.6 | | −80 | 1 | 0.5–5.0 | ...do | 0.1 | 1,420 | 1,490 | 200 | 147 | 61 |
| 12 | ...do | 0.70 | 9.1 | Poly(ethylene oxide) | | 30,000 | −67 | 3 | 0.5–5.0 | Talcum dolomite (1:1) | 0.3 | 1,430 | 1,520 | 200 | 200 | 47 |
| 13 | ...do | 0.60 | 13.0 | Polyethylene | 10.0 | | −80 | 1 | 0.1–2.0 | Talcum | 0.3 | 1,480 | 1,570 | 200 | 105 | 38 |

What is claimed is:

1. A thermoplastic molding composition consisting essentially of a polyoxymethylene having a reduced specific viscosity of from 0.07 to 2.5 dl. g.⁻¹ and a crystallite melting point of from 150° to 180° C., from 0.0005 to 1.0% by weight, based on the total weight of the mixture, of an inorganic nucleating agent and from 0.1 to 10% by weight, based on the total weight of the mixture, of a polymer having an average molecular weight in the range 1,000 to 1,000,000, a softening temperature below the crystallite melting point of the polyoxymethylene and a second order transition temperature of from −120 to +30° C., the polymer being dispersed in the molding composition in the form of particles having a diameter in the range 0.1 to 5 microns and the polyoxymethylene spherulites formed in the isothermal crystallization of the molding composition at 150° C. under a pressure of one atmosphere having a diameter in the range of from 30 to 250 microns.

2. A molding composition according to claim 1 wherein the nucleating agent is talc.

3. A molding composition according to claim 1 wherein the nucleating agent is a mixture of talc and dolomite.

4. A molding composition according to claim 1 wherein the polymer is a copolymer of ethylene and vinyl acetate.

5. A molding composition according to claim 1 wherein the polymer is polyethylene.

6. A molding composition according to claim 1 wherein the polymer is a copolymer of ethylene and ethylacrylate.

7. A molding composition according to claim 1 wherein the polymer is poly(tetrahydrofuran).

8. A molding composition according to claim 1 wherein the polymer is a copolymer of ethylene oxide and propylene oxide.

9. A molding composition according to claim 1 wherein the polymer is a copolymer of butadiene and acrylonitrile.

10. A molding composition according to claim 1 wherein the polymer is a poly(2-ethyl-hexylmethacrylate).

11. A molding composition according to claim 1 wherein the polymer is poly(ethylene-oxide).

References Cited

FOREIGN PATENTS 1,133,490  11/1968  Great Britain _____ 260—37 AL

LEWIS JACOBS, Primary Examiner

U.S. Cl. X.R.

260—823, 887, 897, 901